United States Patent
Dietrich et al.

(10) Patent No.: US 8,453,975 B2
(45) Date of Patent: Jun. 4, 2013

(54) COUPLING DEVICE FOR COUPLING FUSELAGE SECTIONS; COMBINATION OF A COUPLING DEVICE AND AT LEAST ONE FUSELAGE SECTION; AND METHOD FOR PRODUCING THE COUPLING DEVICE

(75) Inventors: Steffen Dietrich, Hamburg (DE); Wolfgang Gewiontek, Stade (DE)

(73) Assignee: Airbus Operations GmbH, Hamburg (DE)

( * ) Notice: Subject to any disclaimer, the term of this patent is extended or adjusted under 35 U.S.C. 154(b) by 49 days.

(21) Appl. No.: 12/743,429

(22) PCT Filed: Nov. 20, 2008

(86) PCT No.: PCT/EP2008/009833
§ 371 (c)(1),
(2), (4) Date: Dec. 1, 2010

(87) PCT Pub. No.: WO2009/065587
PCT Pub. Date: May 28, 2009

(65) Prior Publication Data
US 2011/0089291 A1 Apr. 21, 2011

Related U.S. Application Data

(60) Provisional application No. 60/989,234, filed on Nov. 20, 2007.

(30) Foreign Application Priority Data

Nov. 20, 2007 (DE) .......................... 10 2007 055 233

(51) Int. Cl.
*B64C 1/06* (2006.01)
*B64C 1/12* (2006.01)

(52) U.S. Cl.
USPC ............................ 244/132; 244/120; 244/119

(58) Field of Classification Search
USPC .................. 244/117 R, 119, 120, 131, 132
See application file for complete search history.

(56) References Cited

U.S. PATENT DOCUMENTS 5,297,760 A * 3/1994 Hart-Smith ................... 244/132
(Continued)

FOREIGN PATENT DOCUMENTS

| DE | 3115791 A1 | 8/1982 |
| DE | 19844035 C1 | 11/1999 |
| GB | 2074117 A | 10/1981 |

OTHER PUBLICATIONS

International Preliminary Report on Patentability for corresponding PCT application PCT/EP08/009833, dated Jun. 1, 2010.
International Search Report for corresponding PCT application PCT/EP08/009833, dated Apr. 16, 2009.

*Primary Examiner* — Tien Dinh
*Assistant Examiner* — Richard R Green
(74) *Attorney, Agent, or Firm* — Matthew B. Dernier, Esq.; Gibson & Dernier LLP

(57) ABSTRACT

A coupling device for connecting fuselage sections, in each case forming a transverse abutting region for creating an aircraft fuselage comprising fuselage sections with a fuselage skin, a multitude of annular frame elements and stringers, wherein the coupling device has a rib-like design and includes: a strip-shaped transverse splicing plate for coupling the fuselage skins, a rib, which extends in the middle on the transverse splicing plate, for coupling an annular frame element, and a multitude of rib-like stringer coupling parts that extend on both sides of the transverse splicing plate, for coupling the stringers, as well as a method for producing the coupling device from a solid, rectangular, material trip of suitable thickness and length.

17 Claims, 4 Drawing Sheets

U.S. PATENT DOCUMENTS

| | | |
|---|---|---|
| 5,518,208 A | 5/1996 | Roseburg |
| 6,364,250 B1 | 4/2002 | Brinck |
| 7,134,629 B2 * | 11/2006 | Johnson et al. ............... 244/119 |
| 2004/0031879 A1 | 2/2004 | Kay |

* cited by examiner

COUPLING DEVICE FOR COUPLING FUSELAGE SECTIONS; COMBINATION OF A COUPLING DEVICE AND AT LEAST ONE FUSELAGE SECTION; AND METHOD FOR PRODUCING THE COUPLING DEVICE

CROSS REFERENCE TO RELATED APPLICATIONS

This application claims priority to PCT Application No. PCT/EP2008/009833, filed Nov. 20, 2008; which claims priority to German Patent Application No. DE 10 2007 055 233.7, filed Nov. 20, 2007, and claims the benefit to U.S. Provisional Patent Application No. 60/989,234, filed Nov. 20, 2007, the entire disclosures of which applications are hereby incorporated by reference.

BACKGROUND

The invention relates to a coupling device for connecting fuselage sections in each case creating a transverse abutting region to produce an aircraft fuselage.

Moreover, the invention relates to a method for producing such a coupling device.

Document US 2004/031879 A1 describes a tail cone of a fuselage of a helicopter with a monocoque outer shell and a tail cone attachment fitting for mounting the tail cone at the main fuselage. Optionally, on the inner side of the outer shell support bars can be mounted.

Document U.S. Pat. No. 5,518,208 A describes coupling devices for connecting fuselage sections.

Aircraft fuselages in aluminium construction are produced by joining several prefabricated fuselage sections that are essentially barrel-shaped. The fuselage sections comprise a multitude of annular frame elements, arranged one behind the other, which are clad with the fuselage skin. The fuselage sections are rendered more rigid with the use of longitudinal stiffening elements, in particular with so-called stringers, which extend essentially in the direction of the longitudinal axis of the fuselage section. The stringers are arranged, so as to be evenly spaced apart from each other, around the circumference on the inside of the fuselage skin. For the purpose of leading the stringers the annular frame elements comprise recesses. In an intersecting region between the annular frame elements and the stringers, additional angle brackets are arranged for further stiffening. Moreover, outside the region of the transverse seam a mechanical connection between the stringers, the annular frame elements and the fuselage skin is established by means of a multitude of clips.

For the purpose of joining the fuselage sections, transverse splicing plates for connecting the fuselage skins and stringer couplings for abutting connections between the individual stringers are used. In order to ensure that the stringers can be connected by means of the couplings, in an end region of the fuselage section, which end region corresponds approximately to the length of a frame element division, the stringers are connected to the fuselage skin only during riveting of the transverse splicing plate.

The current coupling technique for joining prefabricated fuselage sections is associated with a disadvantage in that it requires a large number of individual components and consequently very considerable installation expenditure.

SUMMARY OF THE INVENTION

It is the object of the invention to provide a coupling device and a method by means of which the coupling technique is improved, in particular with regard to the installation expenditure.

This object is met by a coupling device with the characteristics disclosed and described herein. Further embodiments are also disclosed and described herein.

According to the invention, a coupling device or a coupling device is provided, comprising: an elongated or essentially strip-shaped mid-section for coupling or coupling together the two fuselage skins to be connected; a web for coupling an annular frame element, which web is arranged on the annular frame element in such a manner that its mid-plane when viewed in its longitudinal direction extends at an angle and in particular perpendicularly to the mid-plane of the mid-section, seen in longitudinal direction of said mid-section; a multitude of rib-like stringer coupling parts that extend on both sides from the mid-section for coupling stringers, wherein the longitudinal extent of the stringer coupling parts extends transversely and in particular perpendicularly to the longitudinal direction of the mid-section; thickenings in intersecting regions between the stringer coupling parts and the web.

Due to this embodiment, with the use of only one integral single-piece coupling component it becomes possible to join together, in particular to rivet together, both fuselage skins, the stringers, the angle brackets and the annular frame elements in the area of the transverse abutting region. As a result of this the number of necessary coupling components is reduced, as is the expenditure required in the production of a transverse abutting connection between two fuselage sections to be joined.

As an alternative it is possible to design the coupling device in several parts, in other words to arrange several coupling devices on the inside so that they are distributed over the circumference of the fuselage section, which coupling devices, however, viewed per se again are designed in one piece. The connection of the individual components of the fuselage structure by means of the coupling device preferably takes place by means of rivet elements. Instead of conventional riveting connections it is also possible to use screw connections, adhesive connections, clamping connections or any desired combination of the mentioned connection techniques. In order to produce the required pressure tightness it is advantageous in the region of the coupling device to provide additional sealing measures, for example the insertion or application of liquid and/or solid sealing means.

The coupling device preferably comprises an aluminium alloy material, a stainless steel alloy or a titanium alloy. As an alternative it is possible to design the coupling device with a CFP-composite material, wherein the alignment of the reinforcement fibres is preferably oriented along the flux. The fuselage sections to be connected are, as a rule, made entirely from aluminium alloy materials (classic aluminium construction). However, in principle it is also possible to use the coupling device for connecting fuselage sections that entirely or at least in part comprise CFP-composite materials (so-called aluminium-CFP-hybrid construction). However, in this case particular attention must be paid to different coefficients of thermal expansion and/or corrosion problems in the contact region between the metal components of the fuselage sections and the components comprising CFP-composite materials.

As a result of the single-piece design of the coupling device the necessary number of components required for joining two fuselage sections, in particular the number of connecting plates or the like in the transverse abutting region, can be reduced.

According to a further advantageous embodiment, at least two coupling devices reproduce the circumference of the fuselage section.

Preferably for each transverse abutting part to be produced between two fuselage sections to be joined at least two integral coupling devices are used, each of which when viewed per se is designed in one piece, which coupling devices are arranged on the inside of the fuselage sections to be joined, in the transverse abutting region, essentially so as to follow on from each other. However, preferably at least three coupling devices (120° circumferential division or less) are used for connecting two fuselage sections in the transverse abutting region.

As an alternative it is, however, also possible to create a transverse abutting connection between two fuselage sections to be joined, with the use of only a single coupling device.

According to a further embodiment of the coupling device, in each case the distances between the respective rib extensions of the coupling correspond to the distances between the stringers.

This results in a largely tension-free connection between the fuselage sections.

A further advantageous improvement of the coupling device provides for the mid-section to essentially match the curvature of the fuselage section. Matching the radii of curvature of the fuselage section to those of the mid-section of the coupling device likewise results in largely tension-free installation of the coupling device.

According to the invention, in particular a coupling device for coupling fuselage sections in a transverse abutting region which fuselage sections in each case comprise at least one fuselage skin section and a multitude of annular frame elements and stringers, with the coupling device comprising:
- a coupling-part base-body comprising a transverse splicing plate, which extends in circumferential direction of the fuselage sections, for coupling two fuselage skin sections,
- a web that extends in the middle on the transverse splicing plate and that juts out from it for arranging an annular frame element on its exposed end region,
- a multitude of rib-like stringer coupling parts that extend on both sides of the transverse splicing plate, for coupling the stringers, wherein in each case respective two stringer coupling parts extend on respective opposite sides of the coupling-part base-body,
- wherein the coupling device is designed in one piece.

The coupling device can, in particular, be designed in one piece. Furthermore, the coupling device can comprise thickenings in intersecting regions between the stringer coupling parts and the web. Moreover, on each side of the longitudinal extension of the transverse splicing plate, the coupling device can in each case comprise at least two stringer coupling parts.

The underside of the transverse splicing plate can be designed so as to be curved at least in some sections when viewed in longitudinal direction of said transverse splicing plate.

Furthermore, the coupling device can comprise a multitude of holes for coupling the coupling device to the fuselage skins, to the stringers and to an annular frame element by means of a multitude of connecting elements, in particular by means of rivet elements.

For coupling the coupling device in each case to a stringer, said coupling device can comprise a multitude of angle brackets for coupling the coupling device in each case to a stringer, wherein the angle brackets can be coupled to the rib of the transverse splicing plate by way of connecting elements.

The coupling device can comprise an aluminium alloy, a titanium alloy or a stainless steel alloy. The stringer coupling parts can comprise a Z-shaped cross-sectional geometry or an L-shaped cross-sectional geometry. As an alternative, the stringer coupling parts can comprise an SI-shaped cross-sectional geometry or an inverted T-shaped cross-sectional geometry.

According to the invention a combination comprising a coupling device according to the invention and at least one fuselage section is also provided, wherein distances between the contact areas of the stringer coupling parts at the stringers are ±10% equal to the distances between the contact areas of the stringers at the stringer coupling parts.

The combination according to the invention can be designed in such a way that at least two coupling devices reproduce the circumference of at least one of the fuselage sections to be coupled. At least in some sections the transverse splicing plate can match the radius of curvature of the fuselage sections to be joined. Furthermore, coupling of the coupling device to the fuselage skins, to the stringers and to an annular frame element can take place with the use of a multitude of connecting elements, in particular with rivet elements. In addition, the stringers can be connected to the annular frame element by means of a multitude of angle brackets.

According to the invention, furthermore, a method for producing a coupling device according to the invention for connecting fuselage sections to create an aircraft fuselage is provided, which method comprises the following steps: bending of an at first flat rectangular material strip until a predetermined radius of curvature corresponding to the radii of the fuselage sections to be connected is attained; and working the geometric structure of the coupling device out of the material strip.

Working the geometric structure out of the coupling device can also take place by means of chipping methods, in particular by milling, turning or drilling.

As a result of the material strip at first being matched to the radius of the fuselage sections to be joined, the wastage arising in the subsequent processing step, in which working the geometric structure out of the solid material strip takes place, can be minimised. Furthermore, this approach makes it possible for the direction of the fibres within the coupling device to take account of the loads to be expected, and also makes it possible to join the two fuselage sections to the coupling device largely free of any tension. The material strip preferably comprises an aluminium alloy material, a stainless steel alloy, a titanium alloy or any desired combination thereof. As an alternative, the coupling device can also be produced with the use of a fibre composite material, in particular in the so-called TFP process. In this process carbon fibre strands that have been pre-impregnated with an epoxy resin (so-called prepreg reinforcement fibre strands) or dry carbon fibre reinforcement strands are placed, preferably in an automated process and in a flux-optimised direction, onto a suitable carrier material in a multitude of layers arranged one over the other, with their positions then being fixed. By means of the TFP method it is possible to implement complex three-dimensional structures as required in the production of the coupling device. Depending on the starting material that is used, i.e. already impregnated prepreg material or dry carbon-fibre reinforcement strands, curing can take place directly in an oven or autoclave, or it is necessary to first impregnate the dry fibre preform with the use of a suitable plastic material, for example an epoxy resin or the like.

An improvement of the method provides for working the complex geometric structure out of the coupling device, preferably on a CNC processing device, in particular by milling, turning, drilling or any desired combination of these chipping processing techniques. In the case of increased requirements relating to dimensional accuracy of the coupling device, as an alternative it is possible to use chip-free processing measures, for example etching methods or electron discharge or spark erosion machining methods.

BRIEF DESCRIPTION OF THE DRAWINGS

The drawing shows the following:

In the drawing some of the design elements or components that have the same functions have identical reference characters.

FIG. 1 shows a coupling device in a transverse abutting region between two joined fuselage sections.

Figure 1:
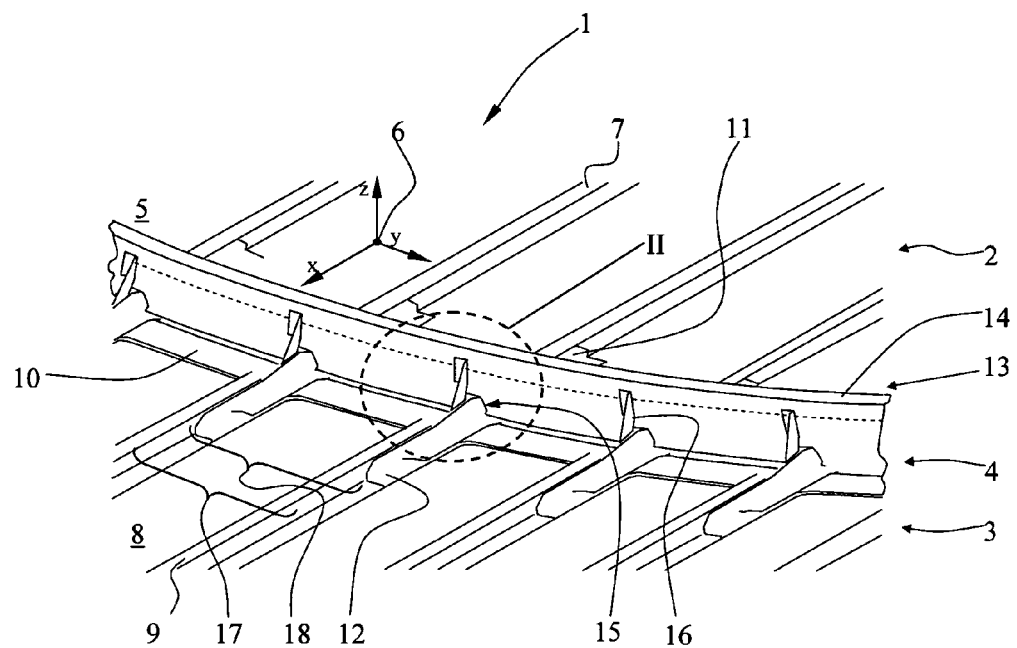
FIG. 1 illustrates a transverse abutting region between two fuselage sections with a coupling device.

The coupling element 1 according to the invention, the coupling device 1 according to the invention or the coupling part is provided for connecting two fuselage sections 2, 3 in a transverse abutting region 4 or transverse seam region of two fuselage skins or skin sections. On a first fuselage skin section 5 of the first fuselage section 2, along an x-axis of the xyz-coordinate system 6, shown in FIGS. 1 to 4, of the fuselage (not shown) created in this manner, of an aircraft, a multitude of stringers extend in longitudinal direction of the fuselage, of which stringers only one stringer is denoted by reference character 7 in FIG. 1. The x-axis extends along the longitudinal axis of the fuselage formed by the fuselage sections. Correspondingly, on a second fuselage skin section 8 of the second fuselage section 3 a multitude of stringers are arranged, of which also only one stringer 9 comprises a reference character representative of the remaining ones. The stringers 7, 9 preferably extend in longitudinal direction of the associated fuselage section, in each case parallel to each other and distributed around the circumference of the fuselage sections 2, 3 so as to be equidistant from each other.

The coupling device or connecting device 1 comprises an annular frame-element coupling-part base-body or a coupling part, which extends in the direction of the frame element, with a transverse splicing plate 10 that extends in circumferential direction of the fuselage sections, and a transverse abutting rib 13 as well as a stringer coupling part 12, which extends transversely to the coupling-part base-body, in the shape of a transverse extension with a rib base of a stringer coupling part or supporting part 20 and a rib of a stringer coupling part. The mid-plane of the longitudinal extension of the rib 19 of the stringer coupling part preferably extends so as to be level and extends at an angle and preferably perpendicularly to the mid-plane of the longitudinal extension of the rib base 20 of the stringer coupling part. Furthermore, the mid-plane of the longitudinal extension of the transverse abutting rib 13 preferably extends so as to be level and extends at an angle and preferably perpendicularly to the mid-plane of the longitudinal extension of the transverse splicing plate 10.

When installing the coupling device 1 with two fuselage sections the transverse splicing plate 10 is situated in the transverse abutting region 4 of the fuselage skin sections to be connected, wherein the underside of the transverse splicing plate 10 preferably covers up the connecting region of the edge areas of the fuselage skin sections to be connected to each other.

The underside of the transverse splicing plate 10 is preferably curved in longitudinal direction of the transverse splicing plate 10; for matching to parts to be coupled it can comprise area sections that are planar in some sections. Preferably, the transverse splicing plate 10 that faces the inside of the fuselage section matches the curvature of the fuselage sections 2, 3, or matches as closely as possible the curvature of the fuselage sections 2, 3 depending on the application case in order to make it possible to join the two fuselage sections 2, 3 as free of tension as possible. The transverse splicing plate 10 and in particular its underside or contact area that faces the fuselage skin sections is designed so as to be elongated and can comprise a base area geometry that has two lateral edges that at least in some sections are parallel and extend in longitudinal direction of the transverse splicing plate, and can, in particular, also be of rectangular shape. During installation of the coupling device 1 to the fuselage sections the longitudinal direction of the transverse splicing plate 10 extends along the facing edge sides of the fuselage skin sections to be connected and in circumferential direction of the fuselage skin 5. Furthermore, the transverse splicing plate 10 extends between the stringers which are connected to the fuselage skin sections to be connected, wherein the stringers can also partly overlap the transverse splicing plate 10 transversely to their longitudinal direction that extends in circumferential direction of the fuselage sections 2, 3.

On both sides of the transverse splicing plate 10 a multitude of, in particular rib-shaped, transverse extensions or stringer coupling parts 12 extend, for example in each case symmetrically, with the longitudinal directions of said transverse extensions or stringer coupling parts 12 extending transversely to the longitudinal direction of the transverse splicing plates 10, and of which in the figures only two stringer coupling parts 11, 12, in a manner that is representative of the remaining ones, comprise a reference character. The transverse splicing plate 10 is connected to the transverse abutting rib 13, which in particular comprises the shape of a web, in a single piece and has, in particular, been produced in one piece with the web. The mid-plane of the transverse abutting rib extends transversely, and in particular perpendicularly, to the contact area of the associated transverse splicing plate 10.

DETAILED DESCRIPTION OF THE INVENTION

Figure 3:
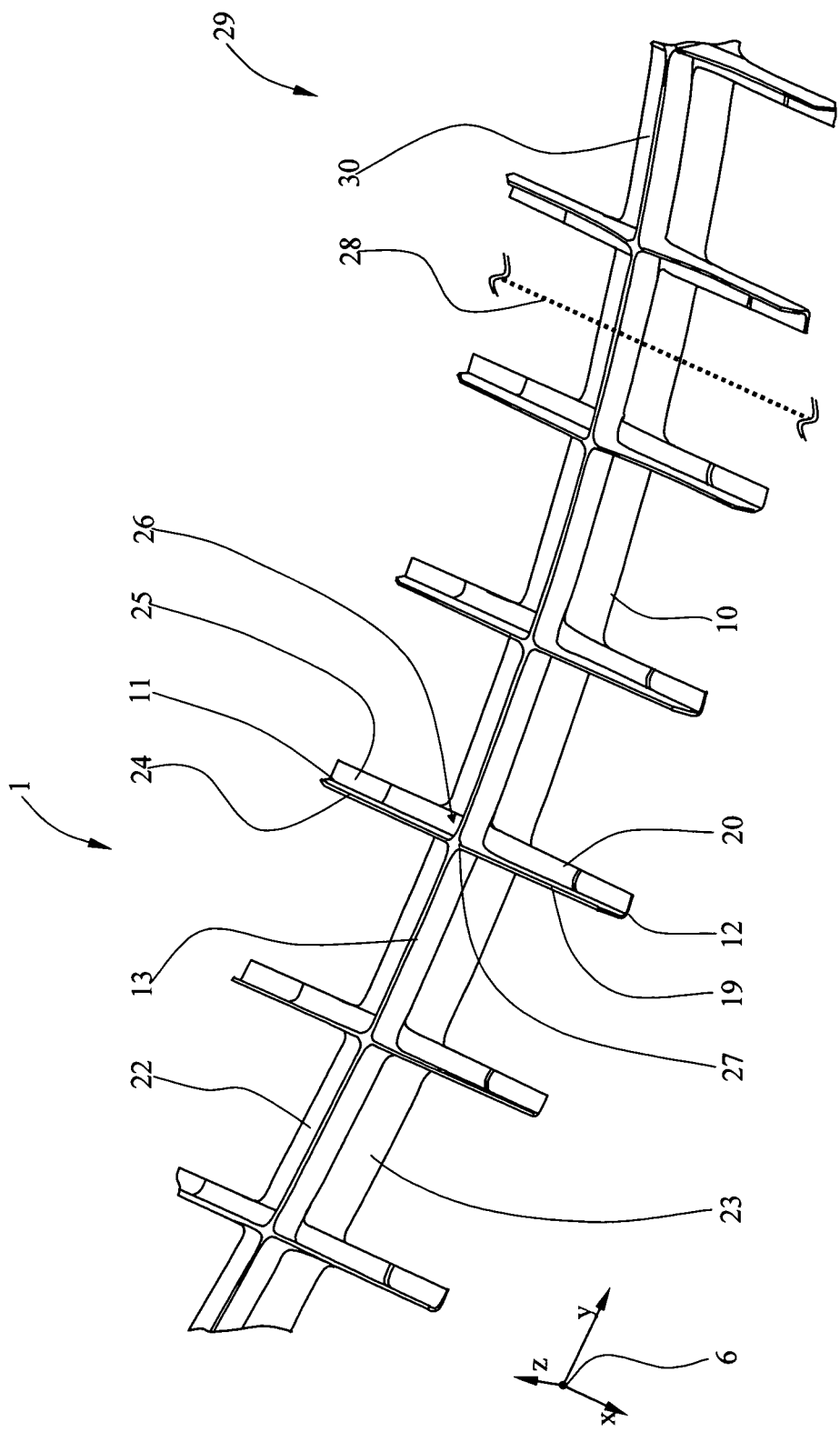
FIG. 3 illustrates a perspective view of two coupling devices, which abut in the region of an apex line (or base line) of the fuselage sections, without fuselage structure elements.

The coupling device comprises at least two pairs of stringer coupling parts 12, which extend laterally of the coupling-part base-body, wherein each pair comprises two stringer coupling parts 12 which, in relation to the longitudinal direction of the transverse splicing plate 10, extend opposite to each other and in relation to the longitudinal direction of the transverse splicing plate 10 are situated opposite each other (FIG. 3). Preferably, in each case two stringer coupling parts 12, starting from the same region of the coupling-part base-body, extend in opposite directions. Starting from the rib base 20 of the stringer coupling part, and in particular from a side edge of the rib base 20 of the stringer coupling part, the rib 19 of the stringer coupling part can extend along it. In particular, the transverse abutting ribs 20 of stringer coupling parts 12 that extend in opposite directions to each other and that are opposite each other can meet in the same region of the transverse abutting rib 13. The ribs 20 of the stringer coupling parts of stringer coupling parts 12 that are arranged one behind the other when viewed in longitudinal direction of the coupling-part base-body can extend from the front (in the direction of the right-hand side of the symmetry axis 28 in the top view of FIG. 3) or the rear (in the direction of the left-hand side of the symmetry axis 28 in the top view of FIG. 3) edge sides of the rib bases 20 of the stringer coupling parts 12.

During installation of the fuselage sections the transverse abutting rib 13 is coupled to an annular frame element 14. The transverse abutting rib 13 and the respective annular frame element 14 can be connected to each other as separate parts or as a single piece. In the diagram of FIG. 1 the transverse abutting rib 13 is covered by the annular frame element 14 and is thus indicated only by a dashed line. The annular frame element 14 can comprise a multitude of indentations or recesses which can, for example, be cut so as to be slightly trapezoidal in shape. In the figures a reference character has only been allocated to one recess 15.

By means of a multitude of connecting elements that are arranged in a matrix-like manner (FIG. 2) and that are not shown in FIG. 1, the coupling device 1 is rigidly connected to the fuselage skins 5, 8, the stringers 7, 9, the annular frame element 14 and a multitude of angle brackets, one of which angle brackets comprises reference character 16. Attachment or arrangement of the angle brackets 16 can, in particular, take place on a sidewall of the stringer coupling rib 19 and on a sidewall of the transverse abutting rib 13, wherein the base body of the angle bracket 16 is affixed to the sidewall of the stringer coupling rib 19, and the end of the base body, which end is opposite the aforesaid, is affixed to a sidewall of the transverse abutting rib by means of a splicing plate or a base angled off from the base body. For example rivet elements, screws, adhesive connections or suitable clamping connection parts or press connection parts can be used as connecting elements. As an alternative, or in addition to the above, it is also possible to use thermal joining methods, in particular the friction stir-welding method or the laser welding method. In the case of thermal joining methods and adhesive methods it may be possible to do without attachment holes for the connecting elements. A distance 17 between the longitudinal axes of two adjacent stringers can in each case correspond to a distance 18 between the longitudinal axes of two adjoining stringer coupling parts 12.

According to the invention, in order to produce the coupling device 1 the latter is worked out of a solid material strip or plate that at first is still rectangular, wherein, preferably before such working out, the required radius of curvature is imparted to the coupling device 1 so as to minimise waste and achieve a favourable fibre alignment.

Figure 2:
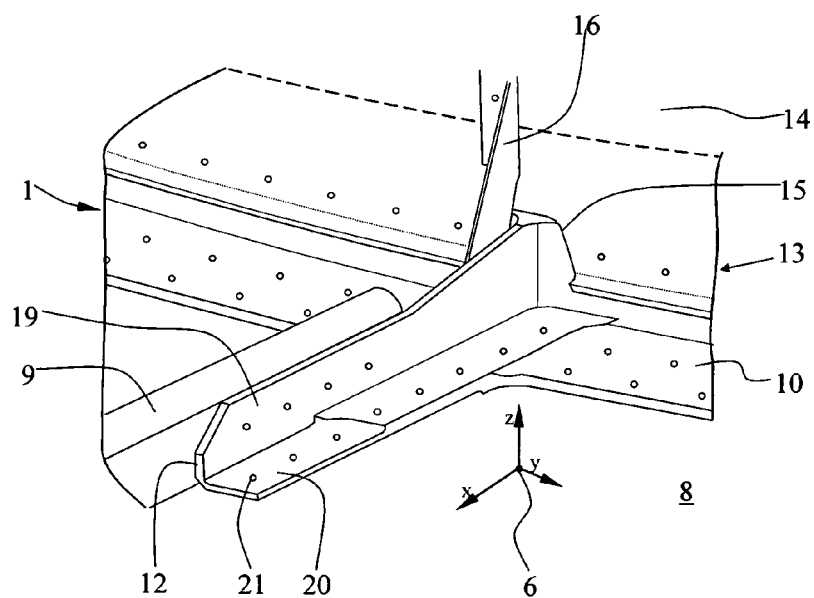
FIG. 2 illustrates an enlarged section of FIG. 1 with the coupling device, the fuselage skin, the stringers, the angle brackets and the annular frame element.

FIG. 2 shows an enlarged section from FIG. 1, indicated in FIG. 1 by a dashed circle. The coordinate system 6 indicates the spatial position of the individual elements of the fuselage structure.

Each rib base 20 of the stringer coupling part of the transverse extensions or of the stringer coupling parts 12 comprises a lower area or contact area which during installation of the coupling device faces the interior area of the fuselage skin. During installation of the coupling device the stringer 9, by means of a multitude of rivet elements, of which one rivet element is representative of all the other rivet elements and comprises reference character 21, is connected to the first rib 19 of the stringer coupling part of the stringer coupling part 12, which first rib 19 is perpendicular in relation to the transverse splicing plate 10, and the second fuselage skin 8 is connected to a second rib 20 of the stringer coupling part of the transverse extension 12, which second rib 20 is situated in the plane of the transverse splicing plate 10. The flanges 19, 20, which abut so as to be approximately perpendicular to each other, form an approximately L-shaped cross-sectional geometry of the transverse extension 12. The transverse extension 11, which follows on from the transverse splicing plate 10 in a mirror-symmetrical manner in relation to the transverse extension 12, has the same geometric shape as the transverse extension 12. The second fuselage skin 8 is connected to the transverse splicing plate 10, and the annular frame element 14 is connected to the perpendicular web 13 by means of rivet elements. By means of the angle bracket 16 a connection is established between the annular frame element 14 and the stringer 9. The trapezoidal recess 15 is required so that the annular frame element 14 can be "placed onto" the coupling device or so that the annular frame element 14 can be riveted to the web 13.

In contrast to the stringer coupling parts 11, 12, which in each case comprise an essentially L-shaped cross-sectional geometry, the transverse splicing plate 10 of the coupling device 1 comprises an essentially inverted T-shaped cross-sectional geometry, which is formed such that the web 13, which extends (parallel to the z-axis) so as to be perpendicular, in the middle on the transverse splicing plate 10, and the transverse splicing plate 10, which in some sections is situated in the xy-plane of the coordinate system 6, provide the base.

FIG. 3 shows respectively abutting coupling devices in an exposed spatial view without any connected fuselage structure elements. The coordinate system 6 again shows the spatial position or arrangement of the individual components.

Connecting two fuselage sections can basically be achieved with merely one coupling device that is approximately circular, oval, ellipsoid, or that follows any desired circumferential geometry of the fuselage section, however, preferably at least two coupling devices are used, preferably coupling devices that follow on from each other, which are arranged on the inside of the fuselage section and which extend over the circumference of said fuselage section in the transverse seam region, in other words which "reproduce" the circumference of said fuselage section.

The coupling device 1 (compare in particular FIG. 1) comprises the stringer coupling parts 11, 12 which on both sides of the transverse splicing plate 10 follow on from said transverse splicing plate 10. Preferably in the middle of the transverse splicing plate 10 the vertical web 13 is arranged, which divides the transverse splicing plate 10 in the transverse abutting region 4 or in the transverse seam region into two longitudinal flanges 22, 23 that are essentially used for coupling the fuselage skins 5, 8. The rib-like stringer coupling part 12 comprises the two rib bases 19, 20 of the stringer coupling part, while the transverse extension 11 comprises correspondingly designed first and second flanges 24, 25. In an intersecting region 26 between the two stringer coupling parts 11, 12 and the transverse splicing plate 10 and the web 13 there is a peg-shaped thickening 27, which is arranged so as to be perpendicular, comprising an essentially square cross-sectional geometry (when viewed from above, against the direction of the z-axis). Further thickenings, not comprising reference characters, extend beyond the coupling device 1, in each case in intersecting regions between two stringer coupling parts and the web 13. FIG. 3 shows that the coupling device 1 is designed so as to be curved along the y-axis of the coordinate system 6 in order to match, as far as possible free of tension, the predetermined radius of curvature of the fuselage sections to be joined. In relation to the y-axis the transverse splicing plate 10 is planar.

In the region of a base line 28 of the fuselage sections (not shown) to be joined the coupling device 1 follows on from a second coupling device 29 that is designed so as to correspond to the first coupling device 1. The stringer coupling parts of the coupling device 29—whilst otherwise comprising a completely identical design—are however arranged in a mirror-symmetrical manner on the transverse splicing plate 30, because the coupling device 29 adjoins the coupling device 1 (essentially seamlessly) in the region of the base line 28. In an alternative embodiment variant (not shown) the stringer coupling parts can also be arranged on the coupling devices 1, 29 so as to point in the same direction. Preferably at least three (segmented) coupling devices that are designed according to the shown coupling devices 1, 29 are used for connecting in each case two fuselage sections (120° circumferential division). In this arrangement the coupling devices 1, 29 preferably abut against each other in an essentially seamless manner. Segmentation makes possible improved handling of the coupling devices 1, 29 during production, which is of importance in particular in the case of fuselage sections with large cross-sectional dimensions.

Figure 4:
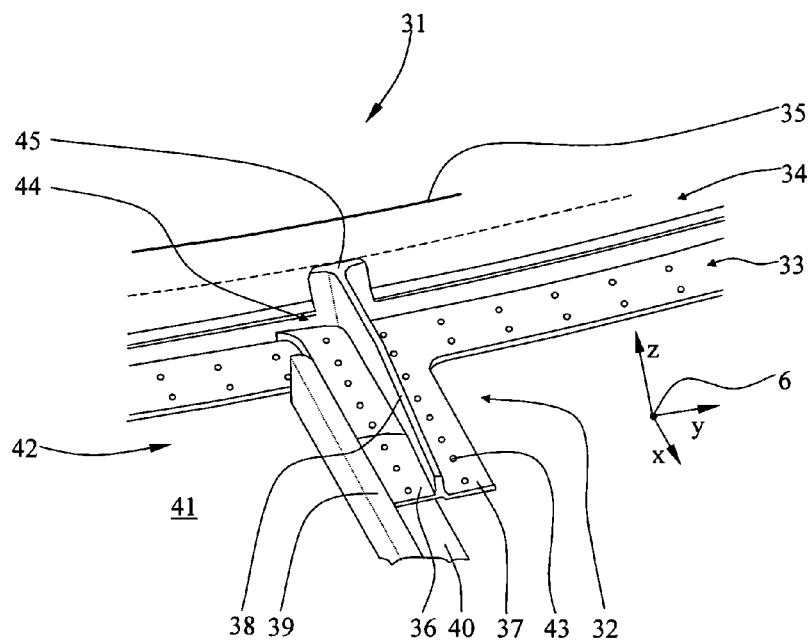
FIG. 4 illustrates an embodiment variant of the coupling device.

FIG. 4 shows an embodiment variant of the coupling device. In contrast to the versions shown in FIGS. 1 to 3, in which coupling of the stringer coupling parts of the coupling device takes place by way of the perpendicular flanks of the stringers, in the embodiment according to FIG. 4 coupling of the stringers to the stringer coupling parts takes place at the stringer bases or at the stringer flanges.

A coupling device 31 comprises a multitude of stringer coupling parts, of which FIG. 4 only shows a front transverse extension 32. The transverse extension 32 follows on from a transverse splicing plate 33. The transverse splicing plate 33 is designed so as to be curved in the direction of the y-axis of the coordinate system 6, in other words it matches the local curvature of the fuselage sections to be connected. Approximately in the middle of the transverse splicing plate 33 a perpendicular web 34, shown by a dashed line, extends so that the transverse splicing plate 33 comprises an essentially inverted T-shaped cross-sectional geometric shape. An annular frame element 35 of a fuselage section (not shown) is connected by means of a multitude of connecting elements (not shown in the drawing), in particular by means of rivet elements. The transverse extension 32, in accordance with the transverse splicing plate 33, comprises an also inverted T-shaped cross-sectional geometry with two flanges 36, 37 positioned in the xy-plane. In the middle of the flanges 36, 37 a perpendicular web 38 extends as a stiffener for the transverse extension 32. A stringer 39 comprises an essentially Ω-shaped cross-sectional geometry with a stringer base 40 that follows on at the underside. In contrast to the embodiment variants of FIGS. 1 to 3, connection of the transverse extension 32 takes place by way of the stringer base 40 and the underlying fuselage skin 41 of a fuselage section 42 rather than by means of a stringer flank (arranged so as to be perpendicular and parallel to the z-axis). The actual mechanical connection between the stringer base 40, the fuselage skin 41 and the transverse extension 32 takes place by way of a multitude of connecting elements, in particular rivet elements, of which only one rivet element 43, representative of the remaining ones, comprises a reference character. In an intersecting region 44 between the transverse extension 32 and the transverse splicing plate 33 there is again a peg-shaped thickening 45 with an almost square cross section in order to provide the required static strength of the coupling device 31.

Figure 5:
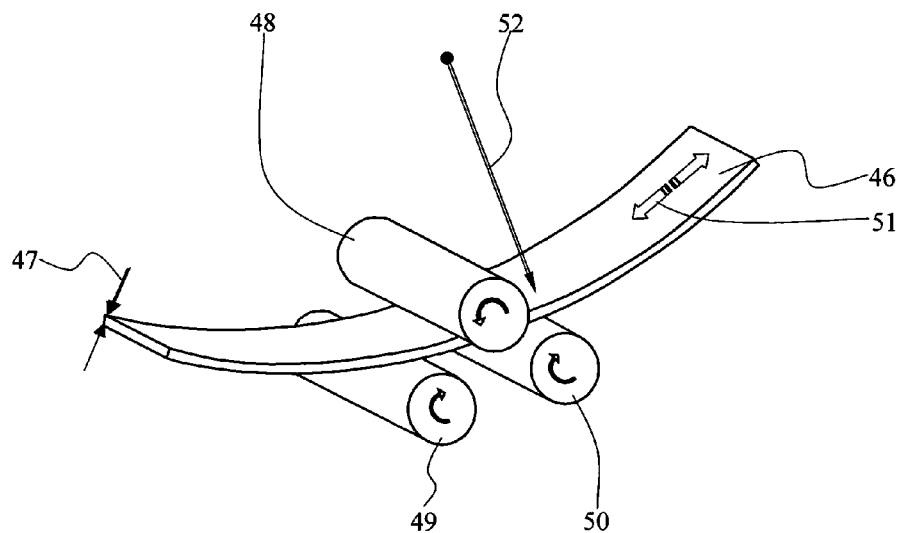
FIGS. 5 and 6 illustrate a production method for producing the coupling device.
Figure 6:
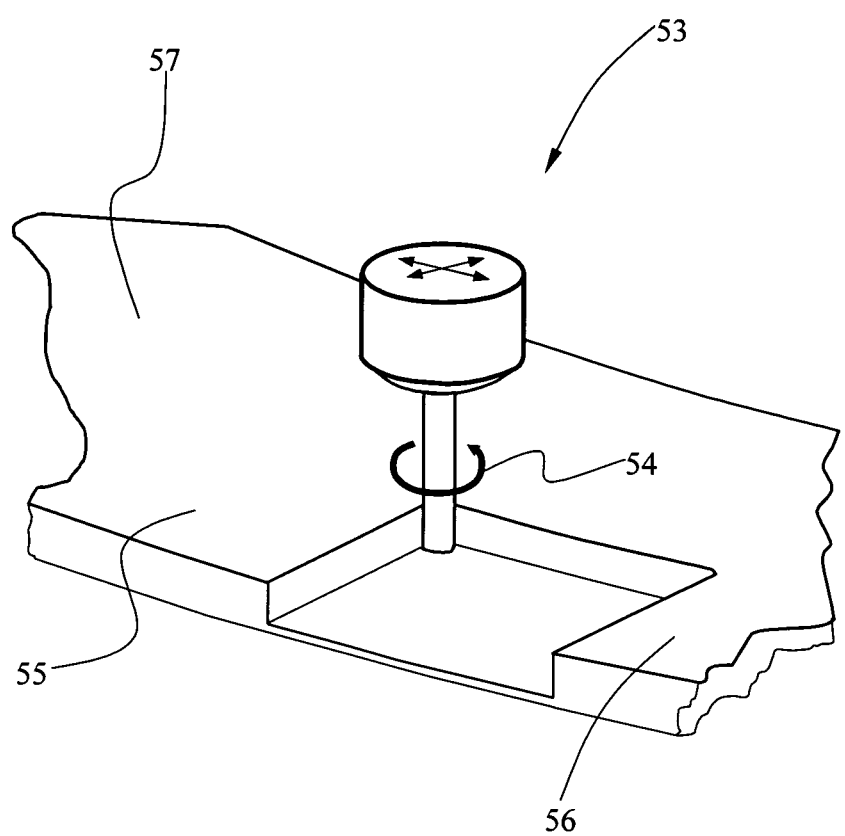

FIGS. 5 and 6 diagrammatically illustrate the method for producing the coupling device that according to the invention comprises a single piece, and in particular is produced in a single piece.

As shown in FIG. 5, in a first method-related step an initially still planar, rectangular, material strip 46 of suitable thickness 47, or an elongated plate, is fed in the direction of a double arrow 51 through an arrangement of, for example, three pressure rollers 48 to 50, whose axes of rotation (not shown with a reference character) are suitably spaced apart from each other, until a radius of curvature 52 is achieved, which essentially corresponds to the radius of curvature or to the local curvature of the fuselage sections that are to be joined by means of the coupling device. The length of the material strip 46 is preferably dimensioned in such a way that it approximately corresponds to at least one third of the internal circumference of the two fuselage sections, which are to be joined, in the transverse seam region. In this arrangement the pressure rollers 48 to 50 rotate in, or against, the direction of the three white arrows.

In a second method-related step the end contour of the coupling device to be produced, or of what will later become the coupling device, including all the stringer coupling parts, webs, thickenings in the intersecting regions, the transverse splicing plate with the web, and with all the holes for the connecting elements to be incorporated is worked out in one piece from the solid material strip 46, preferably by chipping processing techniques such as, for example, milling, turning or drilling. To this purpose the material strip 46 is spatially positioned by means of clamping devices (not shown), and by means of a CNC processing device 53 comprising a rotary tool 55 that, for example, rotates in the direction of the arrow 54, in particular in the form of a milling machine or drilling machine, is machined. In the diagram of FIG. 6 already the first beginnings of the stringer coupling parts 55, 56 and of the transverse splicing plate 57 have been worked from the solid material. In the case of more stringent requirements relating to dimensional accuracy of the coupling device it is possible, instead of chipping processing methods, to use chip-free production techniques, for example electron-discharge machining methods, wire erosion methods, plasma etching methods, chemical etching methods or the like. Preferably, the material strip 46 for producing the subsequent coupling device comprises an aluminium alloy material, which can easily be processed automatically, a stainless steel alloy or a titanium alloy.

As a result of the curvature of the material strip 46 imparted in the first method-related step according to the predetermined radius of curvature 52 of the fuselage sections to be joined, wastage during working the coupling device out of the solid material strip is reduced, a favourable fibre alignment in what will later be the coupling device is achieved, and at the same time largely tension-free installation of the coupling device is made possible.

The coupling device according to the invention can already at the time of production be connected to an end region of one of the two fuselage sections to be joined (one-sided prefabrication). As an alternative, two-sided coupling of the coupling device in the transverse seam region may take place only at the time of joining the two fuselage sections.

Basically, with the coupling device according to the invention, fuselage sections in classic aluminium construction, in CFP construction or in mixed construction (so-called aluminium-CFP hybrid construction) can be joined to form complete fuselages for aircraft.

LIST OF REFERENCE CHARACTERS

1  Coupling device
2  Fuselage section (first)
3  Fuselage section (second)

-continued

LIST OF REFERENCE CHARACTERS

| | |
|---|---|
| 4 | Transverse abutting region |
| 5 | First fuselage skin |
| 6 | Coordinate system |
| 7 | Stringer |
| 8 | Second fuselage skin |
| 9 | Stringer |
| 10 | Transverse splicing plate |
| 11 | Transverse extension |
| 12 | Transverse extension |
| 13 | Web |
| 14 | Annular frame element |
| 15 | Recess |
| 16 | Angle bracket |
| 17 | Distance (stringer) |
| 18 | Distance (stringer coupling parts) |
| 19 | First flange (perpendicular) or rib of the stringer coupling part |
| 20 | Second flange (horizontal) or rib base of the stringer coupling part |
| 21 | Rivet element |
| 22 | Longitudinal flange ⎫ |
| 23 | Longitudinal flange ⎬ mid-section |
| 24 | First flange (perpendicular) ⎭ |
| 25 | Second flange (horizontal) |
| 26 | Intersecting region |
| 27 | Thickening |
| 28 | Base line |
| 29 | Coupling device |
| 30 | Transverse splicing plate |
| 31 | Coupling device |
| 32 | Transverse extension |
| 33 | Transverse splicing plate |
| 34 | Web |
| 35 | Annular frame element |
| 36 | Flange ⎫ |
| 37 | Flange ⎬ transverse extension |
| 38 | Web ⎭ |
| 39 | Stringer |
| 40 | Stringer base |
| 41 | Fuselage skin |
| 42 | Fuselage section |
| 43 | Rivet element |
| 44 | Intersecting region |
| 45 | Thickening |
| 46 | Material strip |
| 47 | Thickness (material strip) |
| 48 | Pressure roller |
| 49 | Pressure roller |
| 50 | Pressure roller |
| 51 | Double arrow |
| 52 | Radius of curvature |
| 53 | CNC processing device |
| 54 | Arrow |
| 55 | Transverse extension |
| 56 | Transverse extension |
| 57 | Transverse splicing plate |

The invention claimed is:

1. A coupling device for coupling fuselage sections in a transverse abutting region, wherein each one of the fuselage sections comprises at least one fuselage skin section and a multitude of annular frame elements and stringers, the coupling device comprising:
    a transverse splicing plate for coupling two of the fuselage skin sections, the splicing plate extending in a circumferential direction of the fuselage sections and connecting the coupling device to the at least one fuselage skin section,
    a perpendicular web, which extends perpendicularly away from a middle of the transverse splicing plate, for coupling an annular frame element to the coupling device, and
    a multitude of stringer coupling parts for coupling the coupling device to the stringers, where each of the stringer coupling parts: (i) extends in a longitudinal direction of the fuselage sections, transverse to the circumferential direction, on both sides of the transverse splicing plate, (ii) has a length that is substantially shorter than the stringer, and (iii) has a portion that is non-coplanar with the transverse splicing plate.

2. The coupling device according to claim 1, wherein the coupling device is designed and produced in one piece.

3. The coupling device according to claim 1, wherein there are thickenings in intersecting regions between the stringer coupling parts and the web.

4. The coupling device according to claim 1, wherein on each side of a longitudinal extension of the transverse splicing plate, the coupling device comprises two of the stringer coupling parts.

5. The coupling device according to claim 1, wherein an underside of the transverse splicing plate is curved at least in some sections when viewed in a longitudinal direction of said transverse splicing plate.

6. The coupling device according to claim 1, wherein the coupling device comprises a multitude of holes for coupling the coupling device to the fuselage skins, to the stringers, and to an annular frame element by means of at least one of: a multitude of connecting elements, and rivet elements.

7. The coupling device according to claim 1, wherein the coupling device comprises a multitude of angle brackets for coupling the coupling device in each case to at least one of the stringers.

8. The coupling device according to claim 1, wherein the coupling device comprises an aluminium alloy, a titanium alloy or a stainless steel alloy.

9. The coupling device according to claim 1, wherein the stringer coupling parts comprise a Z-shaped cross-sectional geometry or an L-shaped cross-sectional geometry.

10. The coupling device according to claim 1, wherein the stringer coupling parts comprise an Ω-shaped cross-sectional geometry or an inverted T-shaped cross-sectional geometry.

11. A method for producing a coupling device for coupling fuselage sections in a transverse abutting region, wherein each one of the fuselage sections comprises at least one fuselage skin section and a multitude of annular frame elements and stringers, the coupling device comprising: a transverse splicing plate for coupling two of the fuselage skin sections, the splicing plate extending in a circumferential direction of the fuselage sections and connecting the coupling device to the at least one fuselage skin section; a perpendicular web, which extends perpendicularly away from a middle of the transverse splicing plate, for coupling an annular frame element to the coupling device; and a multitude of stringer coupling parts for coupling the coupling device to the stringers, where each of the stringer coupling parts: (i) extends in a longitudinal direction of the fuselage sections, transverse to the circumferential direction, on both sides of the transverse splicing plate, (ii) has a length that is substantially shorter than the stringer, and (iii) has a portion that is non-coplanar with the transverse splicing plate, the method comprising the steps of:
    bending a first flat rectangular material strip until a predetermined radius of curvature corresponding to radii of the fuselage sections to be connected is attained, and
    working the geometric structure of the coupling device out of the material strip.

12. The method according to claim 11, wherein working the geometric structure of the coupling device out of the material takes place by means of at least one of chipping methods, milling, turning and drilling.

13. An apparatus, comprising:
at least one fuselage section, where each fuselage section includes at least one fuselage skin section and a multitude of annular frame elements and stringers; and
a coupling device for coupling the fuselage sections in a transverse abutting region, the coupling device including: a transverse splicing plate for coupling two of the fuselage skin sections, the splicing plate extending in a circumferential direction of the fuselage sections and connecting the coupling device to the at least one fuselage skin section; a perpendicular web, which extends perpendicularly away from a middle of the transverse splicing plate, for coupling an annular frame element to the coupling device; and a multitude of stringer coupling parts for coupling the coupling device to the stringers, where each of the stringer coupling parts: (i) extends in a longitudinal direction of the fuselage sections, transverse to the circumferential direction, on both sides of the transverse splicing plate, (ii) has a length that is substantially shorter than the stringer, and (iii) has a portion that is non-coplanar with the transverse splicing plate,
wherein distances between contact areas of the stringer coupling parts at the stringers are ±10% equal to distances between the contact areas of the stringers at the stringer coupling parts.

14. The apparatus of claim 13, wherein at least two coupling devices reproduce a circumference of at least one of the fuselage sections to be coupled.

15. The apparatus of claim 13, wherein the transverse splicing plate matches a radius of curvature of the fuselage sections to be joined.

16. The apparatus of claim 13, wherein coupling of the coupling device to the fuselage skins, to the stringers, and to an annular frame element takes place with the use of at least one of: a multitude of connecting elements, and rivet elements.

17. The apparatus of claim 13, wherein the stringers are connected to the annular frame element by means of a multitude of angle brackets.

* * * * *